United States Patent [19]

Luebke

[11] 4,454,837
[45] Jun. 19, 1984

[54] TRUCK FOR TRANSPORTING BOXES OF POULTRY

[75] Inventor: Ralph C. Luebke, Memphis, Tenn.

[73] Assignee: Moore & Sons, Inc., Memphis, Tenn.

[21] Appl. No.: 440,965

[22] Filed: Nov. 12, 1982

[51] Int. Cl.³ .............................................. B60P 3/04
[52] U.S. Cl. ..................................................... 119/12
[58] Field of Search ...................... 119/12, 13, 14, 21; 98/6; 62/414, 418

[56] References Cited

U.S. PATENT DOCUMENTS

| | | | |
|---|---|---|---|
| 1,577,639 | 3/1926 | Halloway | 119/12 |
| 2,311,640 | 2/1943 | Cornell | 119/21 |
| 2,332,034 | 10/1943 | West | 98/6 |

*Primary Examiner*—Hugh R. Chamblee

*Attorney, Agent, or Firm*—Marshall, O'Toole, Gerstein, Murray & Bicknell

[57] ABSTRACT

This disclosure relates to a truck for transporting concentrated loads, particularly chicks, requiring air circulation. The truck includes a body that forms a load space, and equipment for circulating and treating air in the load space. A floor cavity is formed at the bottom of the load space and a ceiling cavity is formed at the top of the load space. In an instance where chicks are transported, the chicks are placed in chick boxes which are stacked in rows in the load space. The stacks are separated and stabilized by spacers and support ducts. The support ducts are connected to the floor and form ducts which conduct air upwardly from the floor cavity. The ducts have air openings formed therein at spaced intervals, and the circulating air moves out of the ducts and directly into the boxes.

17 Claims, 5 Drawing Figures

TRUCK FOR TRANSPORTING BOXES OF POULTRY

This invention relates to trucks or vans for transporting concentrated loads of poultry or small animals requiring air circulation.

It is quite common in the poultry business to transport poultry over long distances. For example, trucks have been provided for transporting day-old chicks in loads of around 50,000 chicks. The chicks are placed in chick boxes which are stacked in rows in the load area of the truck.

It will be apparent that a truck of this nature must meet rigorous air control requirements. Not only must fresh air be circulated among the chicks, but the temperature of the air must be controlled within a narrow range. Further, the air requirements must be met under widely varying weather and operating conditions; for example, heating and cooling apparatus may be needed for winter and summer operation, and the requirements for high speed highway operation are different from those when the truck is standing in traffic or in a parking area.

A prior art truck of this type includes a transport body having vent openings at its front and rear. Circulation fans cause fresh air to enter the body through the front opening and pass through a plenum and into a cavity below the floor. The air may be heated or cooled in the plenum. Holes in the floor enable the air to flow from the floor cavity upwardly into the load area, past the chick boxes, through holes formed in the ceiling, into a ceiling cavity, and out of the body through the rear vent. While the foregoing construction has been widely and successfully used, it has the disadvantage that all the chick boxes may not be adequately ventilated. The circulating air tends to flow upwardly past the stacks of boxes from the floor to the ceiling, and there may not be sufficient air circulation through all of the boxes.

It is a primary object of the present invention to provide improved apparatus for controlling the circulation of air through the load area of such a truck.

Apparatus in accordance with this invention is for use as part of a transport body of a truck which includes a body floor that forms the upper side of a floor cavity, and a body ceiling that forms the lower side of a ceiling cavity. A plurality of air holes are formed through the floor and the ceiling, and the floor is designed to support stacks of boxes which have vent openings formed in the sidewalls thereof. Between the stacks of boxes are provided generally vertically extending supports which are fastened to the floor and to the ceiling, the supports engaging the stacks of boxes and preventing the boxes from shifting or toppling during shipment. In addition, at least some of the supports form air ducts or channels, the lower ends of the ducts being connected to receive air from the floor cavity. A series of vertically spaced holes are formed in each duct on its side which faces an adjacent stack of boxes, and the duct holes are generally aligned with the vent openings in the boxes. Therefore the air moves out of the floor cavity and upwardly through the ducts, and generally horizontally out of the duct holes and into the vent openings of the boxes. Consequently, the duct-supports both support the boxes and carry air directly into the boxes, thereby ensuring adequate and substantially uniform air movement through all of the boxes.

The foregoing and other objects and advantages of the present invention will become more apparent from the following detailed description taken in conjunction with the accompanying figures of the drawings, wherein:

FIG. 3 is a fragmentary, enlarged view of a portion of the structure shown in FIG. 2;

Figure 1:
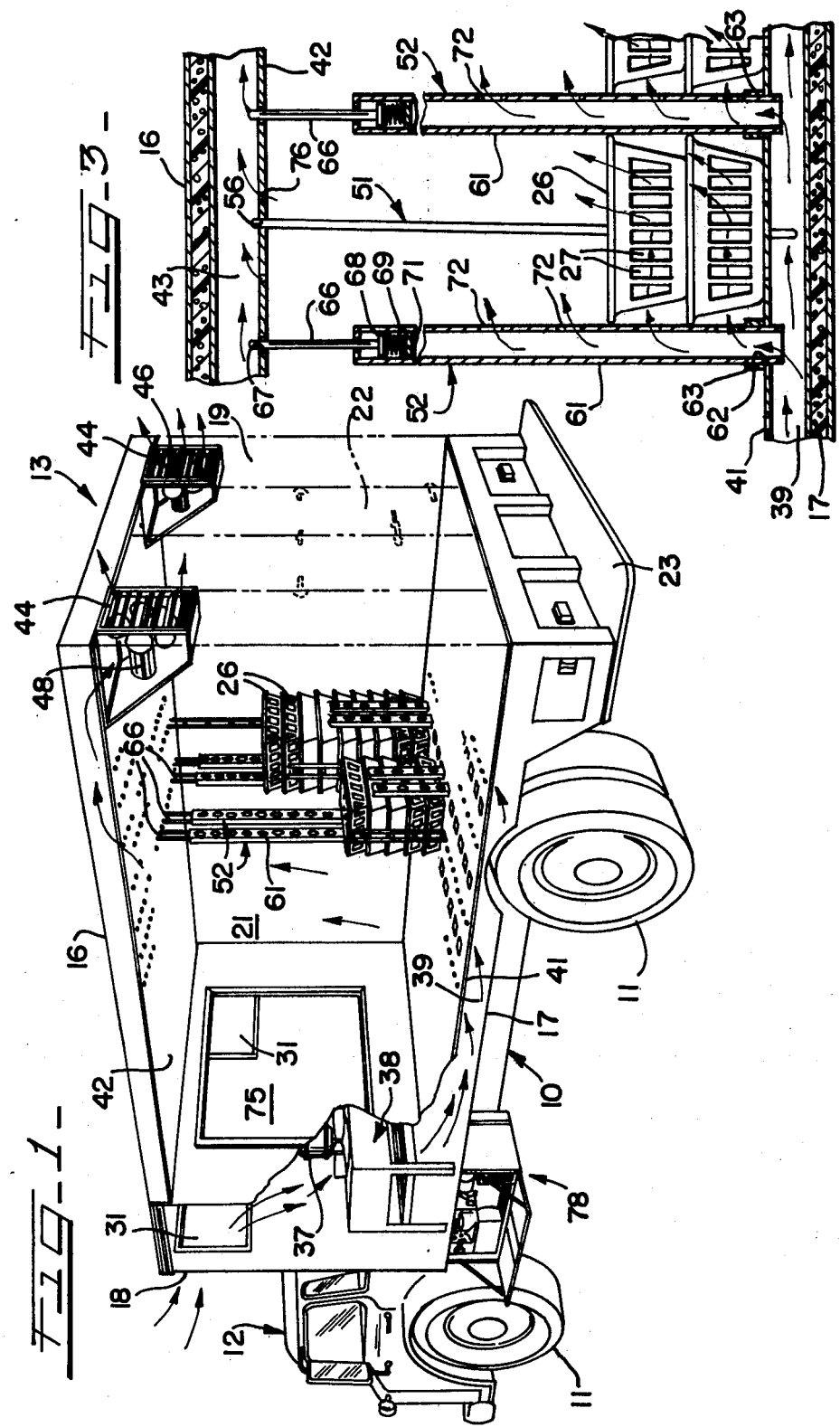
FIG. 1 is a perspective view of a truck with some parts broken away to show underlying parts, the truck incorporating apparatus in accordance with the invention.
Figure 2:
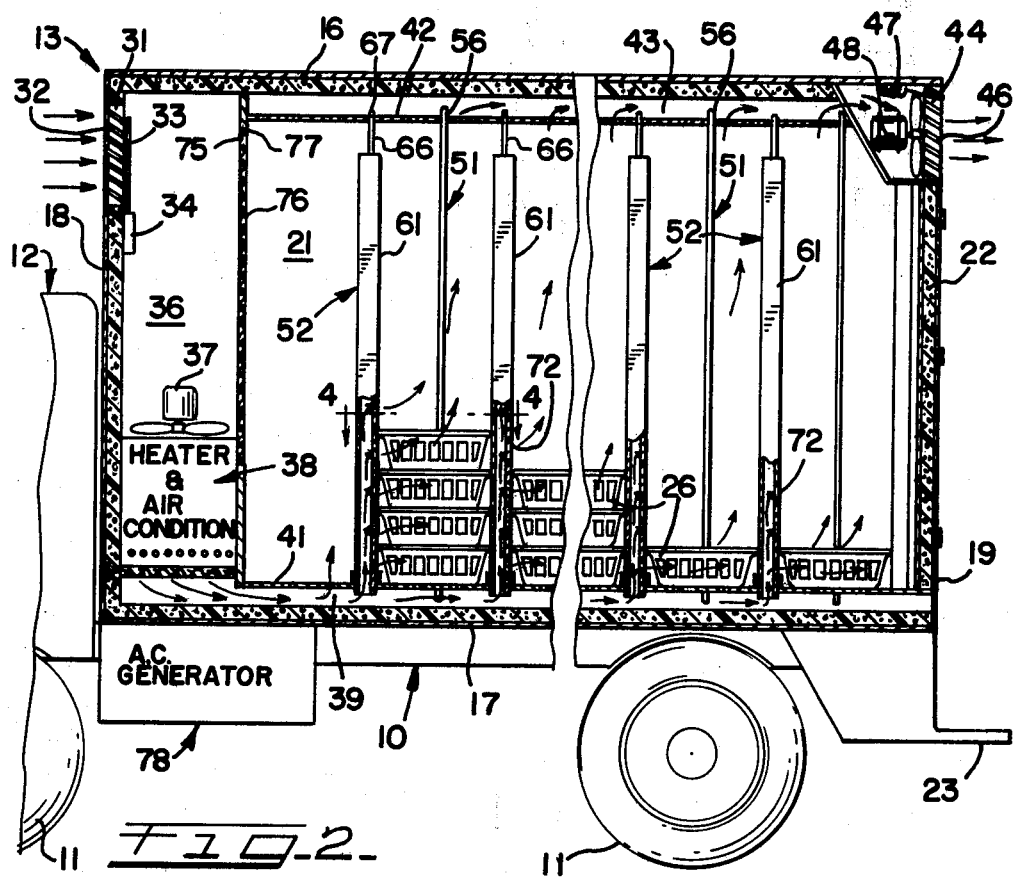
FIG. 2 is a side view partially in section of the truck.

The truck or van illustrated in FIGS. 1 and 2 includes a truck frame 10 mounted on wheels 11 in the conventional manner. At the front of the truck is a driver's cab 12 and rearwardly of the cab is a transport body 13. The body 13 is formed by top and bottom walls 16 and 17, front and rear walls 18 and 19, and two side walls 21. The walls are preferably insulated and are connected together in a conventional manner to form an interior load space which receives the commodity to be transported. Doors 22 are preferably formed in the rear wall 19 and are shown in phantom lines FIG. 1. Additional doors may be formed in the curb side wall 21 to permit access to the center and forward portions of a load. A step 23 is preferably formed at the rear of the truck to assist attendants in entering and leaving the load space through the rear door 22.

The truck is designed to carry various products, such as small animals and poultry, and in the specific example illustrated herein, it is equipped to transport boxes of chicks. It is customary in the industry to transport chicks by placing them in boxes 26 and stacking the boxes in rows within the load space. The boxes 26 are formed by bottom and side walls, and ventilation openings 27 are formed in the four side walls. The boxes are sturdy enough that they may be stacked on one another to a height of 7-15 boxes without damage to the boxes or the chicks.

The truck includes air ventilation and air control means for circulating air through the load space and maintaining the temperature within a narrow range. For day-old chicks, the temperature is preferably around 75° F. The air circulation and control system includes a front vent 31 (FIGS. 1 and 2) formed in the upper part of the front wall 18. The vent 31 is located above the level of the cab 12 so that air will be rammed into the vent 31 as the truck moves along a highway. The vent 31 is provided with adjustable louvers 32 that are connected to a movable rod 33. An electric control motor 34 is connected to move the rod 33 and thereby adjust the louvers 32 to a fully closed position, a fully open position, and various positions in between. The motor 34 is preferably connected to an indicator (not shown) on the control panel in the driver's cab 12 to inform the driver of the position of the louvers.

Directly behind the front vent 31 and the front wall 18 is a plenum or chamber 36 which receives the air moving through the front vent 31. The plenum is formed between the front wall 18 and an interior front wall 77. A recirculation opening 75 is formed in the front wall 77 and a filter 76 is preferably mounted in the opening 75. Near the center of the plenum 36 is an air circulation fan 37 which normally is always in operation when the truck is loaded. Below the fan 37 and adjacent the bottom of the plenum 36 are heater and air conditioning coils 38 through which the circulated air flows. After leaving the coils 38, the circulated air moves into a floor cavity 39 formed between the bottom wall 17 of the truck and a floor 41 which is mounted slightly above the floor 17. The air thus flows into the floor cavity 39 from the plenum and upwardly out of the cavity through a plurality of floor holes to be described hereinafter. The air then flows through the load space that contains the boxes 26 and upwardly to a ceiling 42 which is spaced slightly below the top or upper wall 16. This spacing forms a ceiling cavity 43 that receives the air after it leaves the load space. The air in the ceiling cavity 43 flows rearwardly and out of the body through at least one rear vent 44. In the present instance, two separate rear vents 44 are provided as shown in FIG. 1. Each rear vent 44 includes a movable louver 46 which is normally in the closed position. For example, a spring mechanism 47 (FIG. 2) may be provided to urge the louver 46 to the closed position, and the louvers open automatically when the air pressure upstream of the louvers exceeds a certain value. This may occur either when rear exhaust fans 48 are turned on or when the front vent louvers 32 are opened and the truck is moving at a speed of over, for example, 25 mph.

The boxes 26 are normally placed in stacks as shown in FIGS. 1 and 2, and the stacks are arranged in rows across the width of the truck. In the specific example illustrated, the load space is sufficiently large that four stacks of chick boxes may be placed in each row, and approximately 6–9 rows of stacks may be provided.

Figures 4, 5:
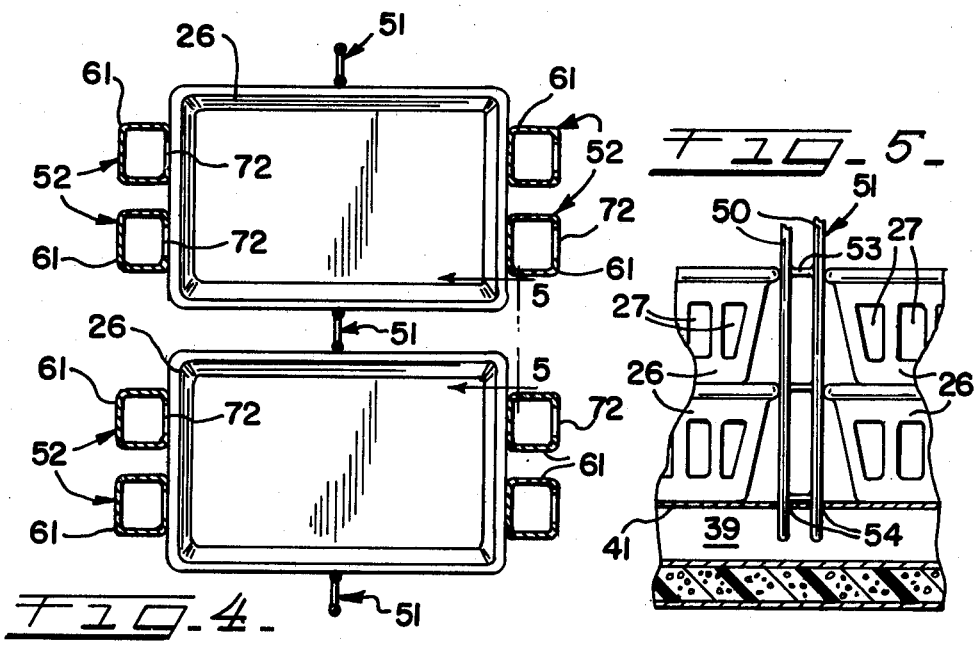
FIG. 4 is a still further enlarged sectional view taken on the line 4—4 of FIG. 2.
FIG. 5 is a fragmentary sectional view taken on the line 5—5 of FIG. 4.

The boxes are prevented from shifting or toppling during movement of the truck by a plurality of spacers 51 (FIGS. 2–5) and supports 52. First with regard to the spacers 51, a spacer is provided between adjacent stacks in each row, as is best illustrated in FIGS. 3 and 4. Each spacer 51 includes a pair of vertically extending rods 50 which are connected together by links 53, leaving large open areas between the two rods for the circulation of air. The spacers 51 are connected to the floor 41 and to the ceiling 42. With reference to FIG. 5, for each spacer, there are provided two holes 54 in the floor and the lower ends of the two rods extend downwardly through the holes 54. The lowermost link 53 rests on the floor 41. The upper ends of the two rods 50 extend into spaced holes 56 (FIGS. 2 and 3) formed in the ceiling 42. A spacer 51 may be mounted in place by first locating the upper ends of the rods 50 in the upper holes 56 and moving the spacer upwardly until the lower ends of the rods 50 may be aligned with the holes 54, and then allowing the spacer to drop downwardly and engage the floor 41. The holes 54 of each pair and the holes 56 of each pair are laterally spaced, and this arrangement of the rods in the holes 54 and 56, of course, maintains the desired orientation of the spacer such that the rods 50 are spaced laterally of the truck body and engage the sides of the adjacent stacks of boxes.

The boxes 26 are further supported against forward and rearward movements by the supports 52. As best shown in FIGS. 2 and 3, each support 52 includes a vertically extending tubular duct 61 which is generally square or rectangular in cross section. The lower end of each duct 61 extends into a hole 62 formed in the floor 41. The lower end of each duct 61 is held away from the bottom wall 17 to enable the circulating air to flow upwardly from the floor cavity 39 and into the interior of the duct, by means of a sleeve or collar 63 that is secured to the duct 61 as by welding. The collar 63 is adjacent the lower end of the duct 61 and it is sized to rest on the margin of the hole 62 in order to hold the lower end of the duct above the bottom wall 17. The upper end of each support 52 is attached to the ceiling 42 by a pair of laterally spaced rods 66, the upper ends of the rods 66 extending through laterally spaced holes 67 formed in the ceiling 42. The lower ends of the pair of rods 66 extend into the upper end of the duct 61, and the rods are urged upwardly by a spring arrangement. In the present specific example, the lower ends of each pair of rods 66 are secured to a movable support plate 68, and a compression spring 69 extends between the plate 68 and a stationary support plate 71 that is secured within the interior of the duct 61. The plate 71 and the upper end of the duct serve the dual functions of supporting the rods 66 for vertical movement and also closing off the upper end of the duct so that the circulating air cannot move upwardly out of the upper end. A support 52 is mounted in place by, for example, positioning the lower end of the duct 61 in a hole 62, moving the rods 66 downwardly by compressing the spring 69, aligning the rods 66 with the holes 67, and allowing the rods 66 to move upwardly into the holes 67.

Each duct 61 has a plurality of vertically spaced holes 72 formed therein, and as shown in FIGS. 2 and 3, each hole 72 is generally aligned with the ventilation holes 27 formed in the side walls of a box 26. Thus, air flows upwardly from the floor cavity 39, through the interior of the duct 61, and substantially horizontally out of the duct through the openings 72 and into the holes 27 formed in the boxes 26.

As best shown in FIG. 4, it is preferred that two laterally spaced supports 52 be provided for each stack of boxes so that sufficient air will be circulated into the boxes. The holes 72 are formed in only one vertical side wall of each duct 61, and the holes face toward the rear of the truck in the present example. Thus, the two support ducts at the forward side of each stack of boxes cause air to move rearwardly into and through the boxes of the associated stack. The air flows through the boxes and out through the openings 27 at the lateral sides and at the rearward sides of each box, and then moves upwardly as previously explained. The holes 72 are spaced apart a distance equal to the height of a box 26, and the holes 72 should extend upwardly as high as the boxes are stacked.

As shown in FIG. 3, a plurality of additional holes 76 are preferably formed in the ceiling 42 so that the movement of the air out of the load space will not be restrained. Holes in addition to the holes 62 may be formed in the floor 41. The number and sizes of the holes in the floor should be small enough relative to the size of the circulating fan 37 to create sufficient pressure within the floor cavity 39 to cause air to move upwardly through the ducts 61 and out of the holes 72. To obtain adequate and generally uniform air circulation to all of the boxes in the stacks, it may also be desirable to proportion the sizes of the holes 72 in each duct. In other words, the holes adjacent the lower end of a duct 61 may be made smaller than the holes adjacent the upper end to prevent the majority of the circulating air from moving out of the lower holes.

In the use and operation of the apparatus, the operators who load the truck first mount supports and spacers at the forward end of the load area and then position stacks of boxes between the spacers and the supports. An area at the forward end of the load space adjacent the forward wall 77 may be left empty to allow air circulation to the recirculation opening 75. Of course, additional spacers and supports are mounted in place as the load space is filled while working from the front to the rear of the truck.

The air is circulated and controlled in the following manner. When moving relatively rapidly along the highway, the front louvers 32 may be partially or completely opened, depending on the ambient temperature, allowing air to enter the plenum 36. As previously mentioned, the circulation fan 37 is preferably always on, thereby moving the air into the floor cavity 39 and through the load area as previously described. In some conditions, it may be desirable to close the front louvers 32, and the fan 37 causes some of the air from the load area to recirculate through the filter 76. Depending upon the position of the front louvers, the recirculated air may be combined with fresh intake air. Depending upon the temperature of the air leaving the unit 38 and entering the floor cavity, the operator may adjust the unit 38 to heat or cool the air, or the operator may allow untreated air to circulate through the load area. In a relatively small size van, the air conditioner may be powered by the electrical system of the truck, but in larger trucks, a power generator 78 may be provided to power the air conditioner and the air circulating fans. Such a generator 78 may be powered by a diesel or gasoline engine. The rear exhaust fans 48 are preferably controlled separately by the operator and are turned on as necessary to circulate the air through the load area. The rear louvers 46 adjust automatically in response to the air pressure within the ceiling cavity.

Such a system preferably includes a control panel in the driver's cab 12, which includes at least the following: separate on-off control switches for the two exhaust fans 48; an on-off control switch for the circulation fan 37; a control for the front louver adjustment motor 34 and an indicator to show the position of the front louver; on-off controls for the heater and air conditioning coils 38; a thermometer showing the temperature of the air leaving the coils 38; and at least one thermometer adjacent the ceiling 42 to show the temperature of the air in the load space. If desired, such a truck may also include apparatus for controlling the humidity within the load space.

It will be apparent that the present construction provides for efficient and uniform circulation of air to all of the boxes in the load area, thereby enabling larger loads to be carried and ensuring satisfactory condition of the load upon arrival. The support ducts serve both to support the stacks of boxes and to carry air directly to the boxes. The various controls and the air treatment devices permit the operator to control the condition of the air being circulated.

I claim as my invention:

1. A vehicle for transporting concentrated loads requiring air circulation, said vehicle comprising interconnected walls, floor and ceiling forming a load space, said floor forming a common floor cavity adapted to receive circulating air, and a plurality of support ducts which are mountable in substantially vertical positions in said load space, said support ducts being connectable to said floor, a portion of each of said support ducts forming an air circulation duct which is connected to receive air from said common floor cavity, and each of said support ducts having air outlet means formed therein and enabling air to flow from said air circulation duct into said load space.

2. Apparatus as in claim 1, wherein said floor has a plurality of openings formed therein, said floor openings being in communication with said floor cavity, said air circulation duct including an opening at the lower end thereof which receives air from said floor cavity.

3. Apparatus as in claim 1, wherein said support ducts are removably connected to said floor and said ceiling.

4. Apparatus as in claim 1, wherein said support ducts extend and are connected to said ceiling.

5. Apparatus as in claim 2, wherein said ceiling has a plurality of openings formed therein and forms a ceiling cavity, the air from said load space flowing through said holes and into said ceiling cavity.

6. Apparatus as in claim 1, wherein said air outlet means comprises a plurality of vertically spaced holes.

7. Apparatus as in claim 6, wherein said apparatus is adapted to transport stacks of boxes, the boxes including ventilation openings in the side walls thereof, and wherein at least some of said holes are substantially horizontally aligned with said openings.

8. A truck body for transporting boxes requiring air circulation, said boxes having air circulation openings in the side walls thereof and said boxes being adapted to be arranged in stacks, said body comprising interconnected walls, floor and ceiling forming a load space, said floor forming a floor cavity adapted to receive circulating air, and a plurality of support ducts mounted in substantially vertical positions in said load space, said support ducts being spaced apart in said load space a distance which is generally equal to a horizontal dimension of said boxes and said boxes being adapted to be stacked between said support ducts, whereby said support ducts extend on opposite sides of said stack and thereby support said stacks, said support ducts being connectable to said floor, a portion of each of said support ducts forming an air circulation duct which is connected to receive air from said floor cavity, each of said support ducts having air outlet means formed therein and enabling air to flow from said air circulation duct into said load space adjacent said stacks.

9. Apparatus as in claim 8, wherein said support ducts are removably connected to said floor and ceiling.

10. Apparatus as in claim 8, wherein said ceiling forms a ceiling cavity, and holes are formed in said ceiling cavity for flow of air from said load space to said ceiling cavity.

11. Apparatus as in claim 10, and further including a front air intake formed at one end of said body and connected to said floor cavity, and a rear air exhaust formed at the other end of said body and connected to said ceiling cavity, and an adjustable louver in said front air intake and including visual indicator means for showing the position of said louver.

12. Apparatus as in claim 8, wherein said body has forward and rearward sides and lateral sides, and said boxes are adapted to be arranged in rows of stacks, the rows extending between said lateral sides, and said support ducts being mounted between adjacent rows.

13. Apparatus as in claim 12, wherein said air outlet means comprises a plurality of vertically spaced holes which are formed in the side of each support duct which is adjacent said rearward side of said body.

14. Apparatus as in claim 13, wherein said holes in said support ducts are spaced apart a distance that is substantially equal to the height of each of said boxes, and said holes being generally aligned with said openings in said boxes.

15. Apparatus as in claim 12, wherein two of said support ducts are provided for each of said stacks.

16. Apparatus as in claim 12, and further including a plurality of spacers attached to said floor and extending between adjacent stacks.

17. Apparatus as in claim 16, wherein said support ducts and said spacers extend between and are connected to said floor and said ceiling.

* * * * *